(12) United States Patent
Herzog et al.

(10) Patent No.: US 7,881,318 B2
(45) Date of Patent: Feb. 1, 2011

(54) OUT-OF-BAND KEEP-ALIVE MECHANISM FOR CLIENTS ASSOCIATED WITH NETWORK ADDRESS TRANSLATION SYSTEMS

(75) Inventors: Shai Herzog, Bellevue, WA (US); Marie Hagman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 11/712,123

(22) Filed: Feb. 28, 2007

(65) Prior Publication Data

US 2008/0209068 A1 Aug. 28, 2008

(51) Int. Cl.
*H04L 12/28* (2006.01)
*H04L 12/56* (2006.01)
*G06F 15/16* (2006.01)

(52) U.S. Cl. ...................... 370/401; 709/232
(58) Field of Classification Search ............... 370/401; 709/232
See application file for complete search history.

(56) References Cited

U.S. PATENT DOCUMENTS

| 5,471,564 | A | 11/1995 | Dennis et al. | |
|---|---|---|---|---|
| 6,401,127 | B1 | 6/2002 | Lei et al. | |
| 6,405,262 | B1 | 6/2002 | Vogel et al. | |
| 6,526,433 | B1 | 2/2003 | Chang et al. | |
| 6,553,032 | B1 | 4/2003 | Farley et al. | |
| 6,563,599 | B1 | 5/2003 | Whitfield | |
| 6,687,859 | B2 | 2/2004 | Robsman et al. | |
| 6,697,354 | B1 | 2/2004 | Borella et al. | |
| 6,748,559 | B1 | 6/2004 | Pfister et al. | |
| 6,880,089 | B1 | 4/2005 | Bommareddy et al. | |
| 6,976,071 | B1 * | 12/2005 | Donzis et al. ............... | 709/224 |
| 7,023,905 | B2 | 4/2006 | Farine et al. | |
| 7,068,669 | B2 * | 6/2006 | Abrol et al. ................. | 370/401 |
| 7,139,828 | B2 | 11/2006 | Alkhatib et al. | |
| 7,249,175 | B1 | 7/2007 | Donaldson et al. | |
| 7,406,087 | B1 * | 7/2008 | Quach et al. ................ | 370/401 |

(Continued)

FOREIGN PATENT DOCUMENTS

JP 2002223230 8/2002

OTHER PUBLICATIONS

Beck, et al., "Requirements for OPES Callout Protocols draft-ietf-opes-protocol-reqs-00", Date: 2002, http://tools.ietf.org/pdf/draft-ietf-opes-protocol-reqs-00.pdf.

(Continued)

*Primary Examiner*—Ayaz R Sheikh
*Assistant Examiner*—Tarell Hampton

(57) ABSTRACT

Architecture for maintaining connection state of network address translation (NAT) devices by employing an out-of-band (OOB) technique externally to application connections without imposing additional requirements on the underlying native application(s). The OOB solution can be applied to arbitrary connections without requiring modification to an application protocol and works with TCP and UDP. A keep-alive (KA) application is employed as an OOB mechanism that injects KA packets that appear to the NAT device to be coming from the native connection. These injected packets fool the NAT device into resetting the inactivity timer for that connection, but do not fool or confuse the native application, which is oblivious to the spoofing. Accordingly, the connection will not terminate due to NAT timeouts, and therefore, a client/server protocol, for example, will not need to generate fake activity packets to keep the connection alive.

20 Claims, 10 Drawing Sheets

U.S. PATENT DOCUMENTS

| | | | |
|---|---|---|---|
| 7,483,437 B1* | 1/2009 | Mohaban | 370/400 |
| 7,573,867 B1* | 8/2009 | Welch | 370/352 |
| 2002/0042875 A1 | 4/2002 | Shukla | |
| 2002/0046348 A1 | 4/2002 | Brustoloni | |
| 2002/0118644 A1 | 8/2002 | Moir | |
| 2002/0159463 A1* | 10/2002 | Wang | 370/401 |
| 2003/0002512 A1 | 1/2003 | Kalmanek et al. | 370/401 |
| 2003/0035425 A1* | 2/2003 | Abdollahi et al. | 370/392 |
| 2004/0044771 A1* | 3/2004 | Allred et al. | 709/227 |
| 2005/0188098 A1* | 8/2005 | Dunk | 709/232 |
| 2005/0190754 A1 | 9/2005 | Golikeri et al. | |
| 2005/0209804 A1 | 9/2005 | Basso et al. | |
| 2005/0210126 A1 | 9/2005 | Friedman | |
| 2005/0210292 A1 | 9/2005 | Adams et al. | |
| 2006/0004933 A1* | 1/2006 | Sen et al. | 710/48 |
| 2006/0029083 A1* | 2/2006 | Kettlewell et al. | 370/401 |
| 2006/0069775 A1 | 3/2006 | Artobello et al. | |
| 2006/0072569 A1 | 4/2006 | Eppinger et al. | |
| 2006/0085548 A1 | 4/2006 | Maher, III et al. | |
| 2006/0136534 A1 | 6/2006 | Boon | |
| 2006/0160562 A1 | 7/2006 | Davis et al. | |
| 2006/0187916 A1 | 8/2006 | Vasseur et al. | |
| 2006/0236370 A1* | 10/2006 | John et al. | 726/1 |
| 2006/0277447 A1 | 12/2006 | Martin et al. | |
| 2006/0288373 A1 | 12/2006 | Grimes et al. | |
| 2007/0091907 A1* | 4/2007 | Seshadri et al. | 370/401 |
| 2007/0115834 A1 | 5/2007 | Cuni et al. | |
| 2007/0140193 A1* | 6/2007 | Dosa et al. | 370/338 |
| 2007/0298848 A1 | 12/2007 | Babin | |
| 2008/0059582 A1* | 3/2008 | Hartikainen et al. | 709/204 |
| 2008/0139222 A1* | 6/2008 | Falvo et al. | 455/456.3 |

OTHER PUBLICATIONS

Kalonov, Bahrom, "Mobile IP Traversal Across NAT gateways", Date: Jun. 15, 2002, http://web.it.kth.se/~iw01_kba/MIP_Project.pdf.

Zandy, et al., "Reliable Network Connections", Date: Sep. 2002, http://eeca2.sogang.ac.kr/class/2003_1/AdvancedTopics/thesis/Reliable%20Network%20Connections.pdf.

International Search Report for International Application No. PCT/US2008/054485 dated Aug. 12, 2008.

Ford et al., "Peer-to_Peer Communication Across Network Address Translators", USENIX Association, Date: 2005.

Sharma et al., "Scalable Timers for Soft State Protocols", IEEE, Date: 1997.

Sheth et al., "An Implementation of Transmit Power Control in 802.11b Wireless Networks", University of Colorado, Boulder, Department of Computer Science, Date: Aug. 2, 2002.

* cited by examiner

OUT-OF-BAND KEEP-ALIVE MECHANISM FOR CLIENTS ASSOCIATED WITH NETWORK ADDRESS TRANSLATION SYSTEMS

CROSS-REFERENCE TO RELATED APPLICATIONS

This application is related to U.S. patent application Ser. No. 11/711,937 titled "CONCURRENT CONNECTION TESTING FOR COMPUTATION OF NAT TIMEOUT PERIOD" filed on Feb. 28, 2007 and issued as U.S. Pat. No. 7,693,084 on Apr. 6, 2010, the entirety of which is incorporated by reference.

BACKGROUND

Technological advances in computing devices and networking facilitate access to a wide variety of information and services allowing access from virtually anywhere in the world. Moreover, as the number of computers and portable devices continues to grow connectivity can require that each device be uniquely identified when on the network. Rather than subscribe to the added expense of obtaining separate (or static) IP addresses for each network device, a technique called network address translation (NAT) allows multiple IP nodes behind a router or on an internal (or private) network to share a single public IP address. In other words, a standard is provided that allows one set of unregistered IP addresses to be used for internal network traffic and another set of IP addresses to be used for external or public traffic.

Typically, NAT devices employ a connection timeout timer having a configurable timeout period for mapping connection state between native applications. If a specific NAT port mapping table entry is not used by inbound or outbound traffic for longer than the timeout period, the NAT timer for that connection expires and the entry is purged from the table. Once the entry is purged, the sharing node behind the NAT can no longer be reached over this connection and a new connection must be initiated (e.g., by the sharing node).

A common mechanism to prevent the NAT timer from timing out (or expiring) is known as "keep-alive" (KA) or "heartbeat" processing. Under keep-alive, useless traffic is generated over the connection at shorter intervals than the NAT timeout period to reset (or refresh) the timer and thereby, keep the connection active. When it comes to portable devices that use battery power as the principal power source (e.g., smart phones) conventional keep-alive techniques impact battery life and generate significant wireless activity to keep the connection alive.

A solution for providing long-lived connections through NATs is to build a keep-alive mechanism as part of the native application protocol (an in-band solution). However, disadvantages to conventional mechanisms include the following: the underlying native application protocol has to be modified to accommodate the KA mechanism; a KA mechanism cannot be retrofitted into legacy applications, and requires an application upgrade to be deployed; and, every update to the KA mechanism impacts the core application protocol and has to be tested accordingly.

Additionally, optimizing the conventional KA mechanism is difficult due to in-band constraints, which can include: forcing the KA packet size to be unnecessarily large to accommodate layered native application headers (e.g., large HTTP-hypertext markup language and SOAP-simple object access protocol headers); application logic constrains KA logic and can require additional network connections; the application level may not support fast detection of failure modes and recovery; the application developers may not have the necessary resources, time, or expertise to dedicate to perfecting what is basically a system level solution; and, the difficulty in adapting and responding to mobile roaming and different networking environments.

SUMMARY

The following presents a simplified summary in order to provide a basic understanding of novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides a solution for keeping alive connection state of network address translation (NAT) devices by employing an out-of-band (OOB) technique that can be applied externally to native application connections without imposing any requirements or modifications on the underlying native application and/or application protocol. The technique provides separate keep-alive (KA) applications that operate with the native applications in an OOB manner by injecting KA packets into the native application connection to maintain the connection, and thereafter removing (e.g., dropping) the KA packets before the KA packets reach the native applications. In an alternative implementation, the KA packets are not removed, but processed (e.g., filtered, dropped, . . . ) by the native applications.

The architecture leverages "logical holes" in common NAT state management mechanisms. These logical holes are not "bugs" and as such, are not considered as security holes, but simply an artifact of the constraints placed on an inline networking device. The nature of one logical hole is related to maintaining NAT state based on connection activity. A NAT device initiates a timeout timer for each active connection and resets the timeout (or inactivity) timer for a connection each time the connection experiences traffic (e.g., packet activity). If no traffic is detected on a given connection, the timeout timer expires for that connection and the connection fails. Moreover, NATs typically do not verify the legitimacy of the traffic (e.g., the endpoint from which the traffic came).

Taking advantage of this logical hole, and in one exemplary client/server environment, a second network KA application running on the client and/or the server can be employed as the OOB mechanism to inject spoofed packets that appear to be coming from the native connection. These injected packets fool the NAT device into resetting the inactivity timer for that connection, but do not fool or confuse the native application, which can be oblivious to the spoofing. Accordingly, the connection will not terminate due to NAT timeouts, and therefore, the client/server protocol will not need to generate fake activity packets to keep the connection alive.

The architecture provides persistency to an arbitrary inactive network connection through the NAT device, and works with connection-oriented end-to-end transport protocols such as TCP (transmission control protocol) and connection-less transport protocols such as UDP (user datagram protocol).

To the accomplishment of the foregoing and related ends, certain illustrative aspects of the disclosed novel architecture are described herein in connection with the following description and the annexed drawings. These aspects are indicative, however, of but a few of the various ways in which the principles disclosed herein can be employed and is intended to include all such aspects and their equivalents. Other advan-

DETAILED DESCRIPTION

Figure 1:
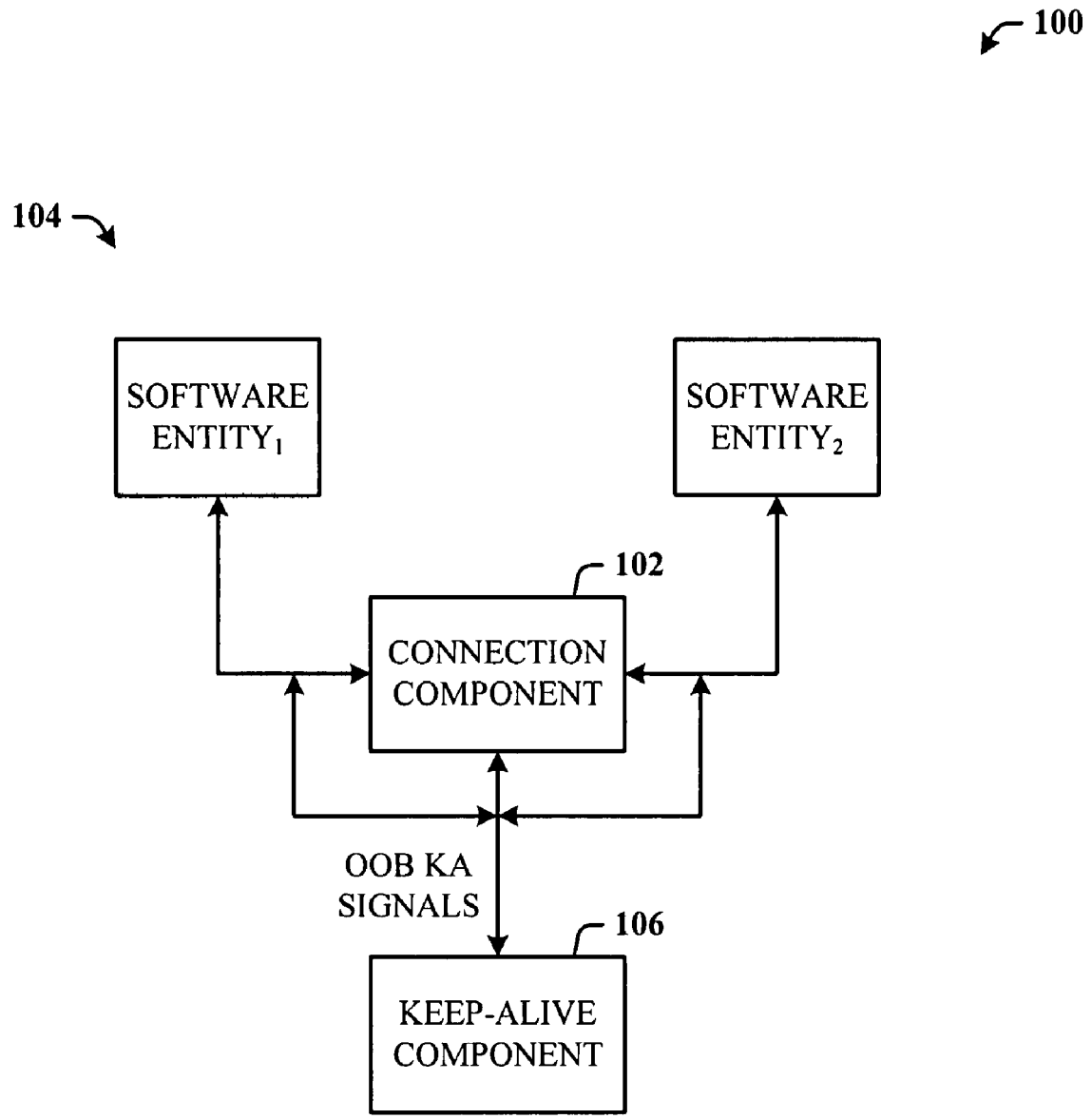
FIG. 1 illustrates a computer-implemented system that facilitates connection management in accordance with an embodiment.

The disclosed architecture provides a solution for keeping alive a connection of a network address translation (NAT) device and/or software by employing an out-of-band (OOB) technique that can be applied externally to native application connections without imposing any requirements or modifications on the native application. The architecture leverages a "logical hole" in common NAT state management mechanisms by injecting spoofed (or keep-alive (KA)) packets from an OOB source (e.g., applications) that appear from the perspective of the NAT device to be part of the native connection (s). These injected packets cause the NAT device to reset the inactivity timer for that connection, but do not fool or confuse the native application(s), which can be oblivious to the spoofing. Accordingly, the connection (e.g., based on TCP-transmission control protocol or UDP-user datagram protocol) will not terminate due to NAT timeouts, and therefore, a client/server protocol, for example, will not need to generate fake in-band KA packets to keep the connection alive.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Referring initially to the drawings, FIG. 1 illustrates a computer-implemented system 100 that facilitates connection management in accordance with an embodiment. The system 100 includes a connection component 102 (e.g., a NAT device) for providing an arbitrary communications connection between software entities 104 (denoted SOFTWARE ENTITY$_1$ and SOFTWARE ENTITY$_2$). The system 100 also includes a keep-alive component 106 that interfaces to the connection component 102 for sending OOB KA packets (or signal(s)) that are processed by the connection component 102 to maintain the connection.

In one implementation, the KA component 106 monitors TCP/IP stack system table activity on the computing systems on which the software entities 104 reside. For example, a new table entry indicates a new connection into which KA packets can be inserted. The TCP/IP table can be monitored in the system on which the software entity resides. For example, a client system table can be monitored. Similarly, where a server is involved, the server system TCP/IP table can be monitored for entry activity (e.g., removal or new entries).

In an alternative and optional implementation, connection packet activity of one or both of the software entities 104 can be monitored by the KA component 106, and based on that activity KA packets are inserted into the connection. The KA packets can be inserted into the corresponding connection of the connection component 102 by the KA component 106, externally and on either or both sides of the connection component 102 (e.g., via other network devices that route packets over the connection) such that inserted KA packets are perceived by the connection component 102 as normal in-band traffic. The KA packet then resets the connection timer for that connection on each detected occurrence of a packet (in-band and/or keep-alive) by the connection component 102.

The system table(s) can be monitored directly by the KA component 106 and/or indirectly via the connection component 102. For example, if table activity indicates that the connection should be maintained, the KA component 106 injects KA packets into the connection such that the KA packets are processed by the connection component 102 to reset a connection timer to maintain the connection.

In an alternative and optional example, connection packet activity (or lack thereof) as monitored by one or more of the software entities 104 can be communicated to the KA component 106 to cause the KA component 106 to send KA packets to the connection component 102, which then inserts the KA packets into the connection for self-processing and timeout timer reset. In yet another example, based on connection packet inactivity, as monitored directly by the KA component 106, and yet a desire to keep the connection alive, the KA component 106 can signal either one or both of the software entities 104 to generate in-band KA packets over the connection to reset the timeout timer for that connection. Where the software entities 104 are KA applications, the KA component 106 can signal either or both of the software entities 104 to insert OOB packets into the connection to maintain the connection. It should be understood that KA packets can be sent periodically irrespective of inactivity in the table(s) or in-band packet traffic.

One implementation of the system 100 includes a NAT device as part of the connection component 102 such that the software entities 104 communicate with each other through the NAT device. The software entities 104 (as native applications) communicate through the NAT via the connection thereby creating an active connection by the regular communication of in-band (only between the native applications) packets. The NAT device, having a timeout timer, continually resets the timer based on receipt of in-band packets from the native applications 104.

However, conventionally, if an in-band packet is not received by the NAT device within the timeout period, the NAT drops the connection and the applications need to re-establish a connection through the NAT device. The architecture solves this problem by providing at least one KA application (e.g., as part of the KA component 106) that launches with one or more of the native applications 104 such that the KA application generates and inserts KA packets into the connection causing the NAT device to automatically reset the timeout timer, and thereby, maintain the connection. When the table entry is removed from the system table(s), the KA packets are no longer inserted into the connection.

In one implementation, the KA component 106 launches the KA application(s) in response to sensing a new entry in the operating system TCP/IP table. Thus, multiple different connections operating through the NAT device can be managed. In another implementation, one KA application is launched for each native application (or software entity 104). Here, the native applications process in-band packet communications and the KA applications carry on OOB packet activity by inserting KA packets into the appropriate NAT connection to main the connection until it is determined that the connection should be left to disconnect. This will be described in more detail in FIG. 2.

Figure 2:
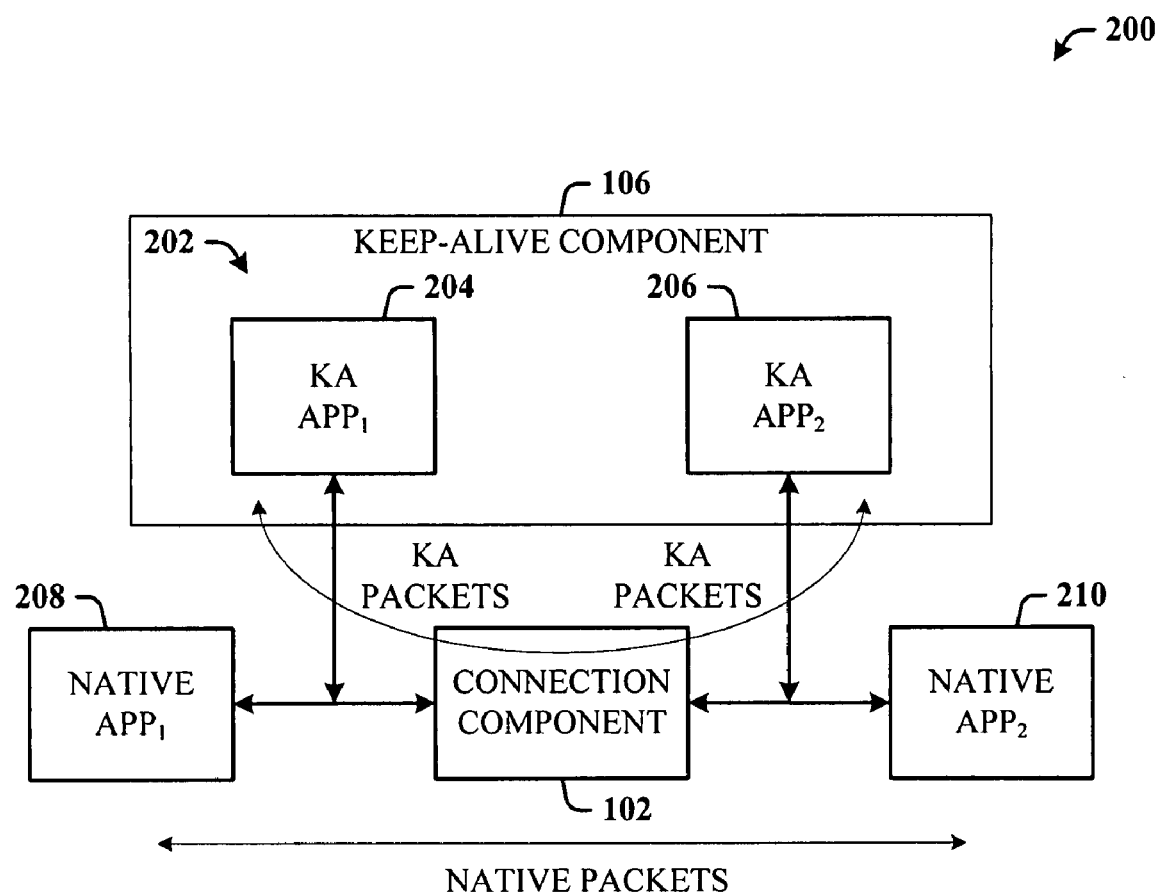
FIG. 2 illustrates a system that employs a keep-alive (KA) application for each native application of the connection.

FIG. 2 illustrates a system 200 that employs a KA application for each native application of the connection. Here, the KA component 106 comprises two KA applications 202: a first KA application 204 (denoted KA APP$_1$) and a second KA application 206 (denoted KA APP$_2$). One or both of the first KA application 204 or/and the second KA application 206 monitor system table entry activity. When a new table entry is detected (e.g., in a TCP/IP system table), one or both of the KA applications (204 or/and 206) begin inserting KA packets into the connection.

In an alternative and optional embodiment, where connection maintenance is based on packet traffic rather than table activity, the first KA application 204 monitors native packet traffic between the connection component 102 (e.g., a NAT device) and a first native application 208 (denoted NATIVE APP$_1$), and/or the second KA application 206 monitors native packet traffic between the connection component 102 and a second native application 210 (denoted NATIVE APP$_2$). As described herein, the native applications (208 and 210) are referred to as communicating in-band and the KA applications (204 and 206) are referred to as communicating OOB. By monitoring the system table(s) associated with the first native application system, the first native application's network 5-tuple (e.g., protocol number, source IP address, source port, destination IP address, and destination port) can be discovered. Based on this information, the first KA application 204 can observe and employ the desired KA refresh period based on the observed timeout of the connection component 102. The KA refresh period is shorter than the timeout period of the connection component 102 such that a KA packet is sent before the timeout period for that connection expires. For example, if the timeout period is fifteen minutes, the refresh can be selected to be ten minutes (or any other suitable value less than the timeout period).

In one alternative and optional operation, based on the refresh period, the first KA application 204 will inject a KA packet into the connection before each timeout period of the connection component 102 expires. This, of course, is based on the packet activity of the first native application 208. In other words, if the first native application 208 has indicated that communications is no longer desired with the second native application 210, by a signal from the first native application 208 to the first KA application 204, for example, the first KA application 204 will cease injecting KA packets into the connection. Thus, the connection component 102 will then timeout the connection and the connection will fail.

In one embodiment, when the first KA application 204 is sending KA packets, the second KA application 206 will remove the KA packets. Thus, the second native application 210 will not need to handle KA packets unnecessarily.

In accordance with a similar and optional operation, by monitoring the packet traffic between the second native application 210 and the connection component 102, rather than system tables, the second KA application 206 discovers the second native application's network 5-tuple (e.g., protocol number, source IP address, source port, destination IP address and destination port). Based on this information, the second KA application 206 can observe and employ a suitable KA refresh period based on the observed timeout of the connection component 102. Based on the refresh period, the second KA application 206 will inject a KA packet into the connection before each timeout period expires. This, of course, is based on the activity of the second native application 210. In other words, if the second native application 210 has indicated that communications is no longer desired with the first native application 208, the second KA application 206 will cease injecting KA packets into the connection. Thus, the connection component 102 will then timeout the connection and the connection will fail.

In another implementation, when the second KA application 206 is sending KA packets, the first KA application 204 will remove the KA packets. Thus, the first native application 208 will not have to handle KA packets.

In accordance with another operation, by monitoring the packet traffic between both of the first and second native applications (208 and 210) and the connection component 102, the corresponding first and second KA applications (204 and 206) discover the native application's network 5-tuple. Based on this information, the first and second KA applications (204 and 206) can observe and employ the desired KA refresh period based on the observed timeout of the connection component 102. Based on the refresh period, the first and/or second KA applications (204 and 206) will inject a KA packet into the connection before each timeout period expires. This, of course, is based on the activity of the corresponding first and second native applications (208 and 210). In yet another implementation, both KA applications (204 and 206) can operate independently as long as at some point before the NAT timeout expires, both sides of the connection component 102 are refreshed.

In other words, according to this optional implementation, if the second native application 210 has indicated that communications is no longer desired with the first native application 208, by a signal from the second native application 210 to the second KA application 206, for example, the second KA application 206 will cease injecting KA packets into the connection. Similarly, if the first native application 208 has indicated that communications is no longer desired with the second native application 210, the first KA application 204 will cease injecting KA packets into the connection. Thus, the connection component 102 will then timeout the connection and the connection will fail. When both of the first and second KA applications (204 and 206, respectively) are sending KA packets, the opposing second and first KA applications (206 and 204, respectively) can remove the received KA packets. Thus, the first and second native applications (208 and 210) will not have to be configured to process KA packets.

Figure 3:
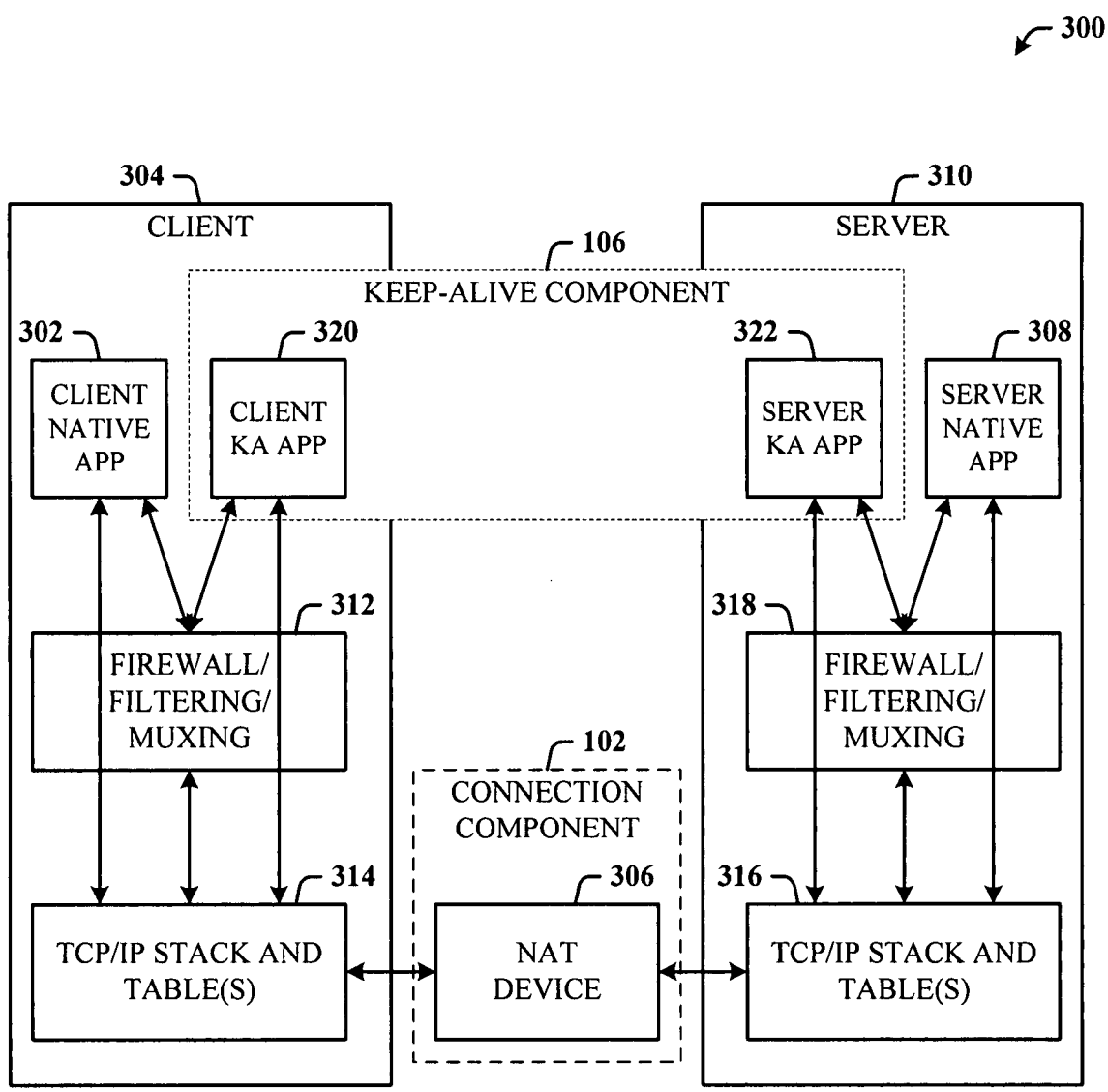
FIG. 3 illustrates a client/server system for maintaining a connection using out-of-band (OOB) KA packets.

FIG. 3 illustrates a client/server system 300 for maintaining a connection using OOB KA packets. More specifically, in a client/server scenario, a client native application 302 of a client 304 opens a long-lived UDP or TCP connection through a NAT device 306 to server native application 308 of a server 310. The architecture works with connection-oriented end-to-end transport protocols such as TCP and connection-less transport protocols such as UDP. The client 304 can also include a firewall, filtering or multiplexing component 312 (hereinafter referred to generally as the firewall 312), through which the communications occur. The communications proceed via a client TCP/IP stack and table(s) 314 through a connection of the NAT device 306, a server TCP/IP stack and table(s) 316, and server firewall 318, to the server native application 308. The stacks (314 and 316) have associated TCP/IP system tables that update with new table entries for each new connection established and drop table entries for connections that are dropped.

In accordance with one implementation, KA applications (described cooperatively as the KA component 106) are launched on both the client 304 and server 310. A client KA application 320 launches on the client 304 and a server KA application 322 launches on the server 310. It is to be understood that the KA component applications (320 and 322) can be launched with the operating systems (client and server) to run continuously as background processes. As described above, the networking 5-tuple (e.g., protocol number, source IP address, source port, destination IP address, and destination port) can be discovered by the KA component 106 (one or both of the client and server KA applications (320 or/and 322)) via the TCP/IP tables associated with the TCP/IP stacks (314 and 316).

The KA applications (320 and 322), cooperatively or independently, can observe and employ the desired KA refresh period (based on the observed NAT timeout). For example, assume the client 304 behind (e.g., on the private side) the NAT device 306 opens a TCP connection to the server 310 (on the public side) and thereafter maintains silence (no packet activity). Establishing this connection causes a new entry in the client TCP/IP system table. Absent the KA component 106, as in conventional implementations, the NAT device 306 will timeout the connection state and render the TCP connection useless. Utilization of the KA component 106 operating in the described OOB fashion ensures that the TCP connection will not terminate due to NAT timeouts, and therefore, the client/server protocol will not need to generate "fake" in-band activity to keep the connection alive. If the observed NAT timeout is fifteen minutes, for example, the refresh period (or value) can be less than fifteen minutes (e.g., ten minutes). In general, the KA refresh period is employed to be less than the observed NAT device timeout period.

In operation, the KA applications (320 and 322), cooperatively or independently (depending on the transport protocol), send a KA (or spoofed) connection packet, from the client 304, the server 310, or both the client 304 and the server 310. The KA component 106 functions to remove the spoofed packets on the receiving side of the NAT device 306, thereby eliminating confusion in the receiving native application by processing the KA packet.

In an alternative implementation, the removal of spoofed packets by the KA component 106 is not performed when the native application (client native application 302 or server native application 308) is sufficiently robust to process the spoofed packets so as to not be confused (or cause errors). This can include recognizing and dropping a spoofed packet. For example, KA packets can be filtered and/or removed on the receiving side by examining packet data for information that uniquely defines a spoofed packet. The KA packets can be zero-payload packets (with headers only). Other ways can be employed as well. The NAT device 306 resets the NAT connection timeout upon each receipt of the spoofed packet (as well as upon receipt of a native packet). Due to the nature of the TCP/IP protocol, spoofing is performed at the raw IP layer, since UDP/TCP protocols do not allow multiple applications to bind to the same 5-tuples for both sender and receiver.

The KA component 106 can discover the native application 5-tuple by communicating with the respective firewalls (312 and 318) and/or the system TCP/IP stacks and tables (314 and 316). Additionally, KA packet removal can be accomplished by the respective receiving firewalls (312 and 318) using the filtering functionality. Moreover, the system 300 is not restricted to client/server scenarios but is also applicable to peer-to-peer topologies.

Figure 4:
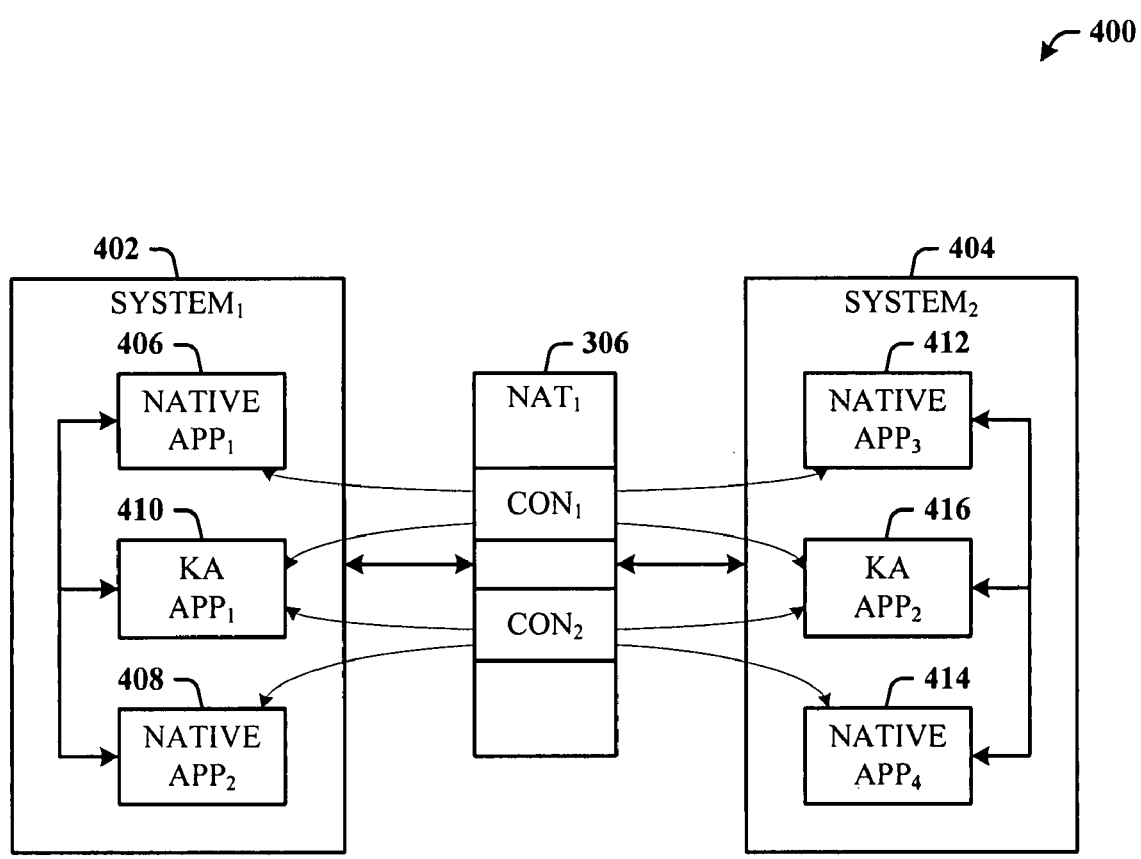
FIG. 4 illustrates an alternative system where a KA application operates to process connection state for multiple connections.

FIG. 4 illustrates an alternative system 400 where a KA application operates to process connection state for multiple connections. The system 400 includes a first system 402 (e.g., a portable computer) seeking to communicate through the NAT device 306 to a second system 404. The first system 402 includes two native applications: a first native application 406 and a second native application 408. The first system 402 also includes a first KA application 410 that interfaces to the first and second native applications (406 and 408) to monitor native application intersystem (402 and 404) activity of the first system 402 via TCP/IP system table entries of the first system 402. Optionally, the first KA application 410 can also monitor connection state of the connections via the NAT device 306.

Similarly, the second system 404 (e.g., web server) communicates through the NAT device 306 to the first system 402. In this particular example, the second system 404 includes two native applications: a third native application 412 and a fourth native application 414. The second system 404 also includes a second KA application 416 that interfaces to the third and fourth native applications (412 and 414) to monitor native application activity of the second system 404 via TCP/IP system table entries of the second system 404. Optionally, the second KA application 416 can also monitor connection state of the NAT connections via the NAT device 306.

In this example, the first and third native applications (406 and 412) open a first connection (denoted $CON_1$) through the NAT device 306, and the second and fourth native applications (408 and 414) open a second connection (denoted $CON_2$) through the NAT device 306. Based on new TCP/IP system table entries in the first system 402 and/or new TCP/IP system table entries in the second system 404, the first and second KA applications (410 and 416) provide the KA packets into the corresponding first and second connections to maintain connection state for the desired first and/or second connections.

In an initial state, where no native applications in either system (402 or 404) are active, the KA applications (410 and 416) are not launched. When the first native application 406 opens the first connection through the NAT device 306, the first KA application 410 launches and employs the refresh period for first connection KA packets. The first connection is active to the third native application 412, for example; however, if the connection is inactive and it is desired that the first connection should not be inactive, the first KA application 410 will automatically insert the first connection KA packets into the first connection to maintain the first connection. Upon detection of activity in the third native application 412, the second KA application 416, now the recipient KA application, will filter out the received KA packets from the packet stream. Thus, the third native application 412 can receive the packet stream unhindered by KA packet processing or filtering.

If the second native application 408 is activated at this time, and opens the second connection to the fourth native application 414, the first KA application 410 already knows the refresh period of the NAT device 306, and hence, applies KA connection maintenance to the NAT device 306 for the second connection ($CON_2$) should inactivity control be desired.

Accordingly, the first KA application 410 can manage multiple connections through a single NAT device 306. In an alternative operation, the first KA application 410 manages the first connection while the second KA application 416 of the second system 404 manages the second connection. It can be seen that in typical implementations of NAT devices having multiple ports for multiple connections, multiple-connection KA management can be performed.

Figure 5:
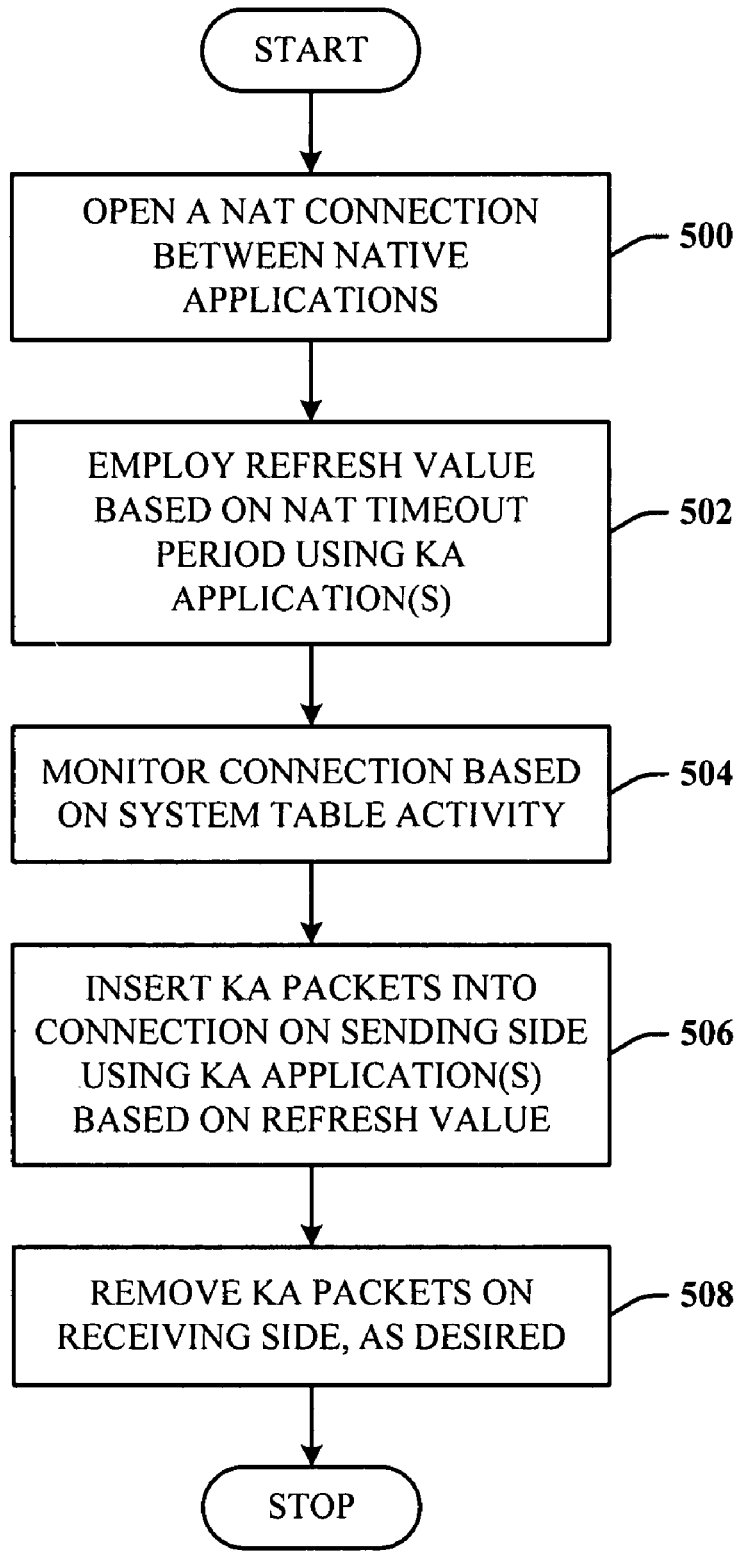
FIG. 5 illustrates a method of OOB KA management.

FIG. 5 illustrates a method of OOB KA management. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts of a methodology may be required for a novel implementation.

At 500, a NAT connection is opened between native applications of different systems. At 502, a refresh period is determined for the NAT connection. In other words, the KA application can include a table of refresh values based on which a KA packet will be transmitted. The refresh value can be hard-coded (e.g., every thirty seconds) in the KA application or the KA application can use a pre-computed value. Optionally, the refresh period can be computed automatically by an associated KA application based on the NAT timeout period. At 504, the connection is monitored based on system table activity. At 506, KA packets are automatically inserted into the connection on a sending side using the KA application based on the selected refresh value. At 508, the KA packets are removed on the receiving side, as desired. In other words, it is not a requirement that the KA packets be removed on the receiving side by the receiving KA application.

Figure 6:
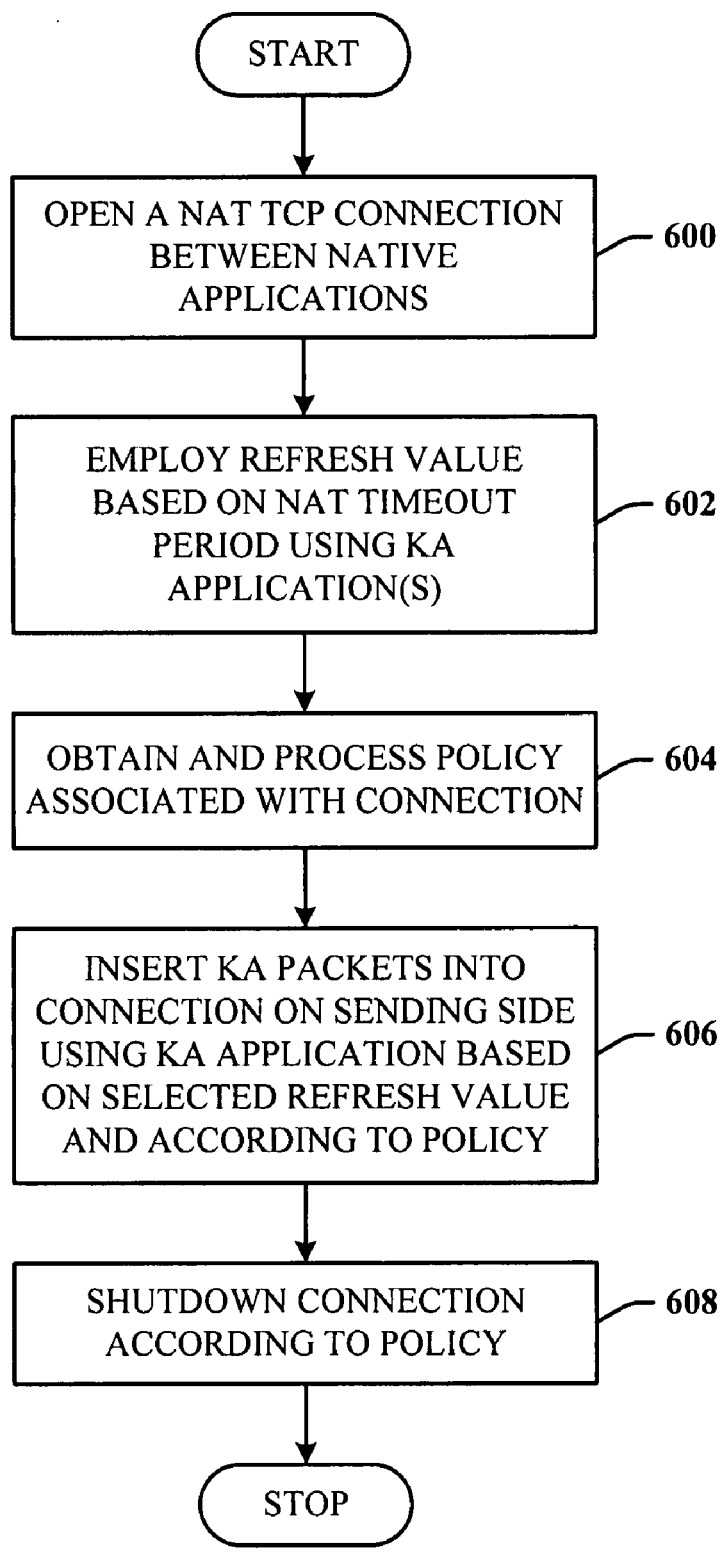
FIG. 6 illustrates a method of connection management based on a connection policy.

FIG. 6 illustrates a method of connection management based on a connection policy. At 600, a NAT connection is opened between native applications. At 602, a refresh value is selected by an associated KA application based on the NAT timeout period. At 604, a policy associated with the connection is obtained and processed. At 606, KA packets are automatically inserted into the connection on a sending side using the KA application based on selected refresh value. At 608, the connection is operated with KA packets in accordance with the policy. In other words, the policy could indicate that the connection stays open for a predetermined period of time and the connection shuts down when the time expires, whether in-band or OOB packet traffic has terminated or not.

Figure 7:
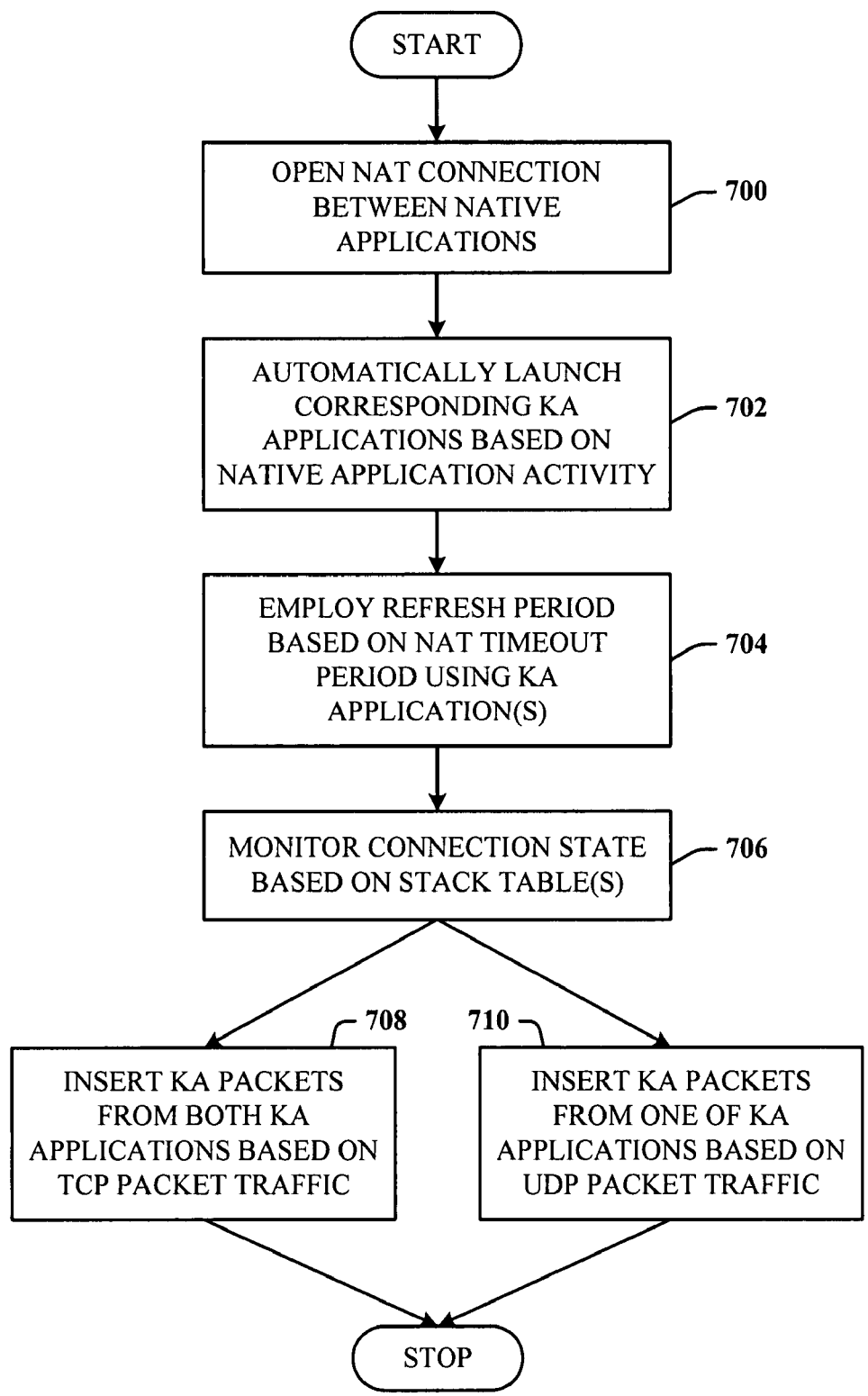
FIG. 7 illustrates a method of managing NAT connection inactivity based on the transport protocol.

FIG. 7 illustrates a method of managing NAT connection inactivity based on the type transport protocol. At 700, a NAT connection is opened between native applications. At 702, based on activity of the native applications, one or more of the corresponding KA applications are launched. At 704, one or more of the KA applications select a refresh period based on the NAT timeout period. At 706, the KA applications monitor corresponding native application connections based on stack table(s) activity. At 708, based on the previous communication of TCP packets, KA packets are automatically inserted into the connection from each of the KA applications. Alternatively, at 710, based on the previous communication of UDP packets, KA packets are automatically inserted into the connection from one or both of the KA applications. Since TCP is a connection-oriented end-to-end transport protocol, it is desired that both KA application operate to insert KA packets and remove KA packets. Since UDP is a connectionless transport protocol, in most cases only one of the KA applications needs to be operational to insert the KA packets into the NAT connection.

Figure 8:
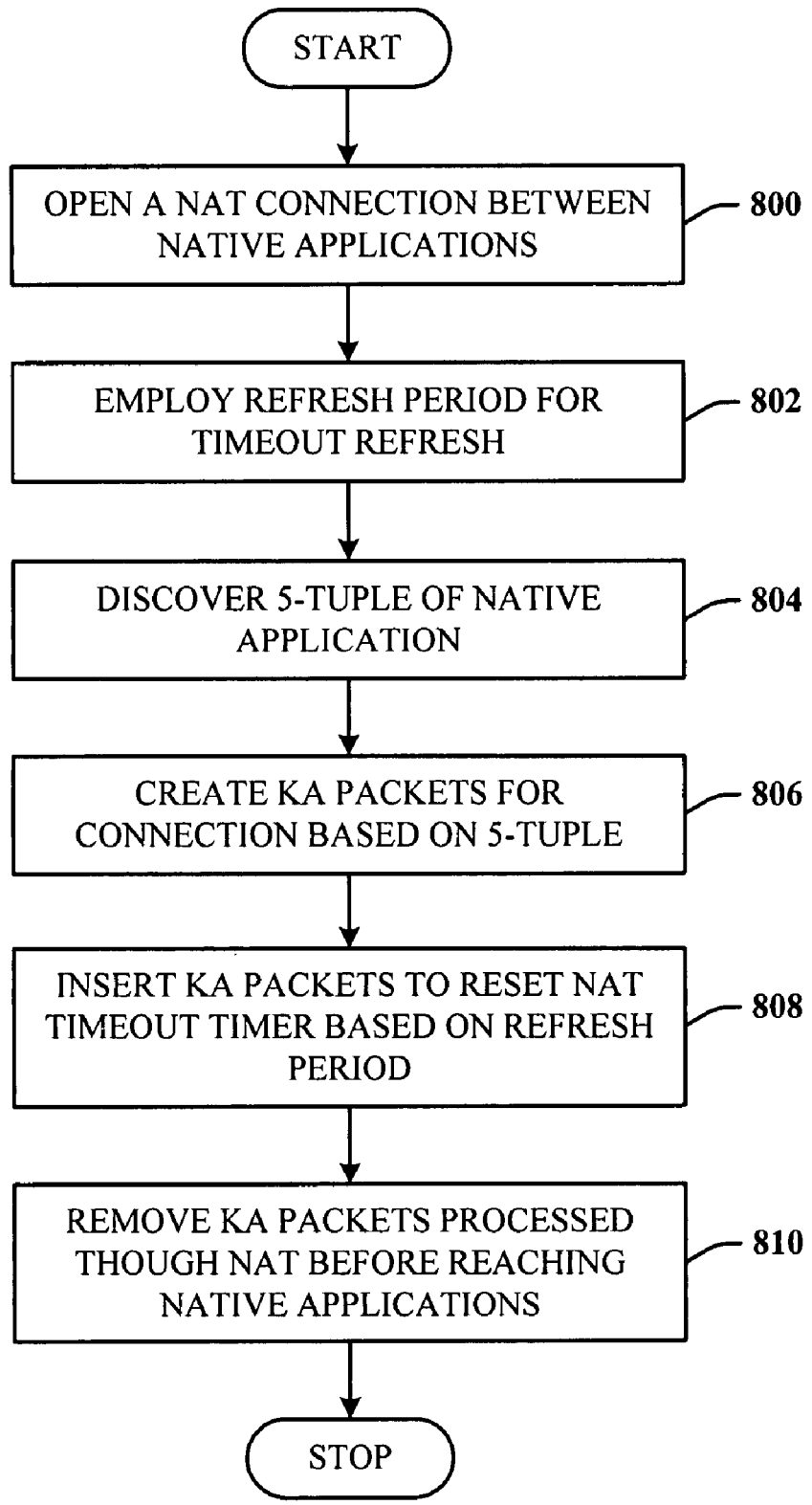
FIG. 8 illustrates a method of generating and utilizing KA packets for connection management.

FIG. 8 illustrates a method of generating and utilizing KA packets for connection management. At 800, a NAT connection is opened through a NAT device by one native application to another native application. At 802, after launching KA applications, a refresh period is utilized by one or more of the KA applications. At 804, a discovery process is initiated to discover a networking 5-tuple of the native application(s). This can be via TCP/IP tables. At 806, KA packets are structured for a particular connection using 5-tuple information. At 808, KA packets are inserted into the connection to reset the NAT timeout timer based on the refresh period. At 810, KA packets that have been processed through the NAT device are removed before reaching the native applications.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 9:
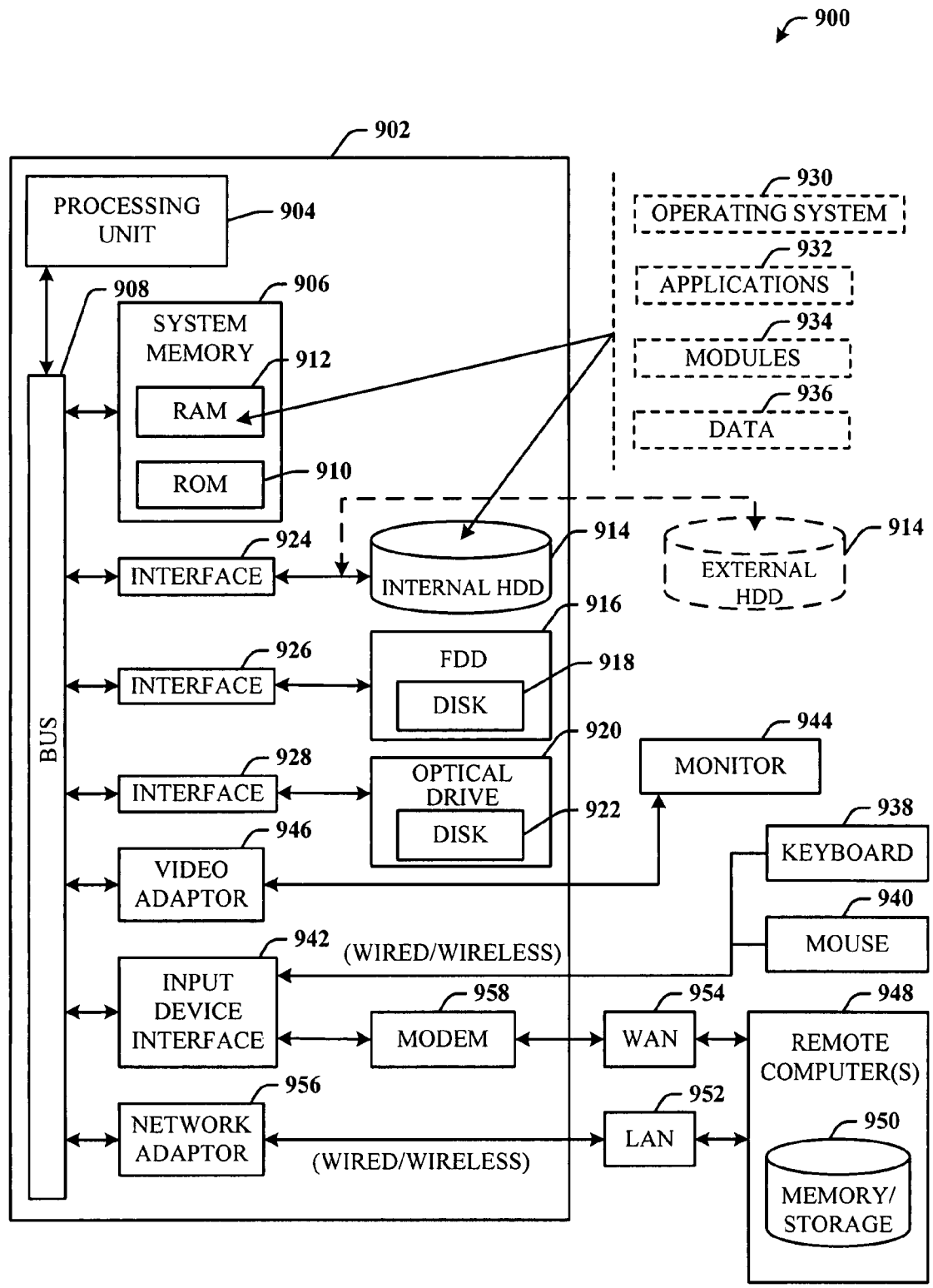
FIG. 9 illustrates a block diagram of a computing system operable to execute the disclosed KA architecture.

Referring now to FIG. 9, there is illustrated a block diagram of a computing system 900 operable to execute the disclosed KA architecture. In order to provide additional context for various aspects thereof, FIG. 9 and the following discussion are intended to provide a brief, general description of a suitable computing system 900 in which the various aspects of the architecture can be implemented. While the description above is in the general context of computer-executable instructions that may run on one or more computers, those skilled in the art will recognize that the architecture also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902, the computer 902 including a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the disclosed methods.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the architecture can be implemented with various commercially available operating systems or combinations of operating systems. The applications 932 and/or modules 934 can include the native applications, KA applications and/or KA components previously described.

A user can enter commands and information into the computer 902 through one or more wired/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 10:
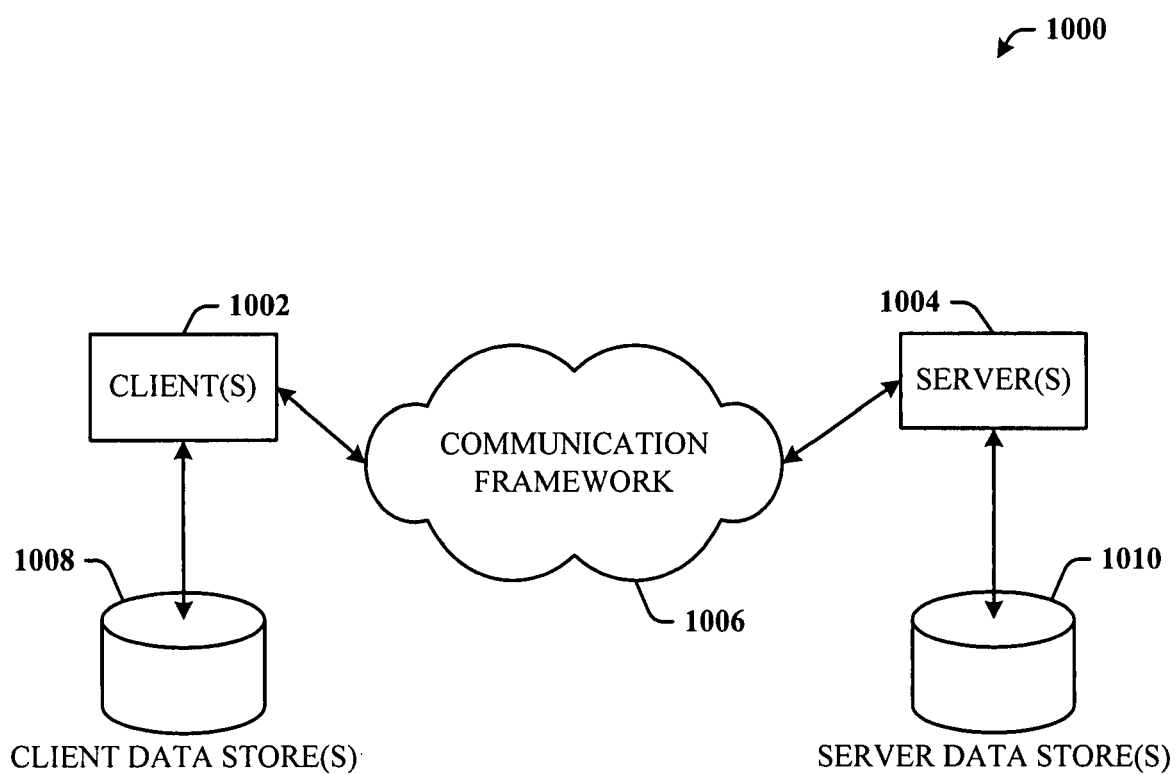
FIG. 10 illustrates a schematic block diagram of an exemplary computing environment that can employ OOB KA processing.

Referring now to FIG. 10, there is illustrated a schematic block diagram of an exemplary computing environment 1000 that can employ OOB KA processing. The system 1000 includes one or more client(s) 1002. The client(s) 1002 can be hardware and/or software (e.g., threads, processes, computing devices). The client(s) 1002 can house cookie(s) and/or associated contextual information, for example.

The system 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

The clients 1002 and the servers 1004 can both include KA applications that monitor network interface devices (not shown) such as NAT routers, gateways, and so on. As previously described, the clients 1002 can interconnect in a peer-to-peer fashion that that connection state management can be internal to one or both of the clients by using the local KA application(s).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates connection management, comprising:
    a connection component including a network device having an inactivity timer, the connection component providing a communications connection between a first software entity on a first computer system and a second software entity on a second computer system, the connection component being configured to drop the communications connection if the network device does not receive an in-band packet communicated over the communications connection between the first software entity and the second software entity within a timeout period of the inactivity timer initiated for the communications connection by the network device; and
    a keep-alive component, distinct from the first software entity and the second software entity, for sending out-of-band (OOB) spoofed packets to the connection component that are perceived by the network device as in-band traffic over the communications connection between the first software entity and the second software entity and reset the timeout period of the inactivity timer to maintain the communications connection between the first software entity and the second software entity,
    wherein OOB spoofed packets that appear to be communicated over the communications connection from the first software entity to the second software entity are inserted by the keep-alive component into the communications connection between the first software entity and the network device, processed by the network device to reset the timeout period of the inactivity timer, and removed by the keep-alive component from the communications connection after being processed by the network device and before reaching the second software entity, and
    wherein the keep-alive component maintains the communications connection between the first software entity and the second software entity by inserting OOB spoofed packets into the communication connection before the timeout period expires until receiving an indication from at least one of the first software entity and the second software entity that the communications connection is no longer desired.

2. The system of claim 1, wherein the arbitrary communications connection accommodates a transport layer connection-oriented end-to-end protocol.

3. The system of claim 1, wherein the arbitrary communications connection accommodates a transport layer connection-less protocol.

4. The system of claim 1, wherein the connection component includes a network address translation (NAT) device that facilitates connection of a private network with a public network.

5. The system of claim 1, wherein the OOB spoofed packets are keep-alive packets.

6. The system of claim 1, wherein the keep-alive component is an application which inserts the OOB spoofed packets based on table activity of a TCP/IP system table.

7. The system of claim 1, wherein the keep-alive component monitors the timeout period of the inactivity timer, employs a keep-alive refresh period based on the timeout period and, based on the refresh period, generates and inserts the OOB spoofed packets into the communications connection.

8. The system of claim 1, wherein the first computer system comprises one of a client and a server.

9. The system of claim 8, wherein the keep-alive component comprises a server-based keep-alive application and a client-based keep-alive application, the server-based and client-based keep-alive applications sending OOB spoofed packets through the connection component to maintain the connection.

10. The system of claim 1, wherein the OOB spoofed packets processed by the connection component are zero-payload packets.

11. A computer-implemented method of managing a connection, comprising:
    establishing a Network Address Translation (NAT) connection for communicating in-band packets between a first native application of a first computing system and a second native application of a second computing system through a NAT device having an inactivity timer, wherein the NAT connection is dropped by the NAT device if the NAT device does not receive an in-band packet communicated over the NAT connection between the first native application and the second native application within a timeout period of the inactivity timer initiated for the NAT connection by the NAT device; and launching a keep-alive application, distinct from the native applications, configured to automatically send out-of band (OOB) spoofed packets to the NAT device that are perceived by the NAT device as in-band traffic over the NAT connection between the first native application and the second native application and reset the timeout period of the inactivity timer to maintain the NAT connection between the first native application and the second native application, wherein the OOB spoofed packets that appear to be communicated over the NAT connection from the first native application to the second native application are inserted by the keep-alive application into the NAT connection between the first native application and the NAT device, processed by the NAT device to reset the timeout period of the inactivity timer, and removed by the keep-alive application from the connection after being processed by the NAT device and before reaching the second native application, and wherein the keep-alive application maintains the NAT connection between the first native application and the second native application by inserting OOB spoofed packets into the NAT connection before the timeout period expires until receiving an indication from at least one of the first native application and the second native application that the NAT connection is no longer desired.

12. The method of claim 11, further comprising automatically inserting the OOB spoofed packets into the connection based upon a predetermined connection policy.

13. The method of claim 11, wherein the NAT connection is facilitated via a transmission control protocol (TCP) communications transport technology.

14. The method of claim 11, further comprising launching corresponding keep-alive applications for the first native application and the second native application, the corresponding keep-alive applications automatically sending OOB spoofed packets to maintain the connection based on a new entry in a TCP/IP system table.

15. The method of claim 14, wherein the corresponding keep-alive applications monitor corresponding system tables for connection state and operate to process connection state for multiple NAT connections.

16. The method of claim 11, further comprising:

discovering a tuple that includes at least two of a protocol number, a source IP address, a source port number, a destination IP address, or a destination port number associated with at least one of the native applications; and resetting the inactivity timer based on OOB spoofed packets that utilize the tuple.

17. The method of claim 11, wherein the OOB spoofed packets removed by the keep-alive application from the connection between the NAT device and the second computing system utilize a destination IP address associated with the second native application.

18. The method of claim 11, further comprising automatically launching the keep-alive application based on in-band activity of at least one of the native applications.

19. The method of claim 11, further comprising automatically launching one or more keep-alive applications and inserting the OOB spoofed packets via the one or more keep-alive applications based on a type of transport protocol employed.

20. A computer-implemented system including a processing unit and memory, the computer-implemented system comprising:

computer-implemented means for automatically establishing a Network Address Translation (NAT) connection for communicating in-band packets between a first native application of a first computer system and a second native application of a second computer system through a NAT device having an inactivity timer, wherein the NAT connection is dropped by the NAT device if the NAT device does not receive an in-band packet communicated over the NAT connection between the first native application and the second native application within a timeout period of the inactivity timer initiated for the NAT connection by the NAT device;

computer-implemented means for automatically launching one or more keep-alive applications which are distinct from the first native application and the second native application;

computer-implemented means for monitoring the NAT connection for inactivity based on a system table; and computer-implemented means for automatically sending out-of-band (OOB) spoofed packets to the NAT device in response to sensing the inactivity that are perceived by the NAT device as in-band traffic over the NAT connection between the first native application and the second native application and reset the timeout period of the inactivity timer to maintain the NAT connection between the first native application and the second native application, wherein OOB spoofed packets that appear to be communicated over the NAT connection from the first native application to the second native application are inserted by a keep-alive application into the NAT connection between the native application and the NAT device based on one of TCP packets and UDP packets, processed by the NAT device to reset the timeout period of the inactivity timer, and removed by a keep-alive application from the NAT connection after being processed by the NAT device and before reaching the second native application, and wherein the keep-alive application maintains the NAT connection between the first native application and the second native application by inserting OOB spoofed packets into the NAT connection before the timeout period expires until receiving an indication from at least one of the first native application and the second native application that the NAT connection is no longer desired.

* * * * *